(No Model.)

C. E. BLAKE, Sr.
DENTAL FORCEPS.

No. 491,519. Patented Feb. 14, 1893.

Witnesses
Chas. F. Miller
Jno. Meister

Inventor
Chas. E. Blake Sr.

UNITED STATES PATENT OFFICE.

CHARLES E. BLAKE, SR., OF SAN FRANCISCO, CALIFORNIA.

DENTAL FORCEPS.

SPECIFICATION forming part of Letters Patent No. 491,519, dated February 14, 1893.

Application filed July 26, 1892. Serial No. 441,329. (No model.)

*To all whom it may concern:*

Be it known that I, CHARLES E. BLAKE, Sr., a citizen of the United States, residing at San Francisco, in the county of San Francisco and State of California, have invented certain new and useful Improvements in Dental Forceps; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved dental forceps, specially designed for removing upper molar teeth, and has for its object to secure a firm grip upon the tooth at its base, the middle claw of one jaw or beak being adapted to enter the bifurcation between the two roots of the tooth, and the side claws of the same jaw, adapted to closely embrace the outer sides of the roots while the claws on the other beak or jaw embrace the opposite root, thus providing for securing a hold upon the tooth that will admit of great pressure and force being applied without crushing the tooth, even though the tooth be but a mere shell, all substantially as hereinafter more fully disclosed and pointed out in the claim.

Figure 1:
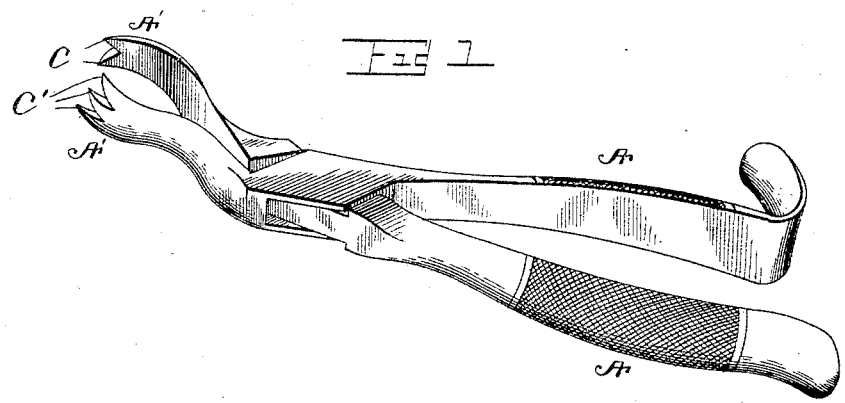
Figure 2:
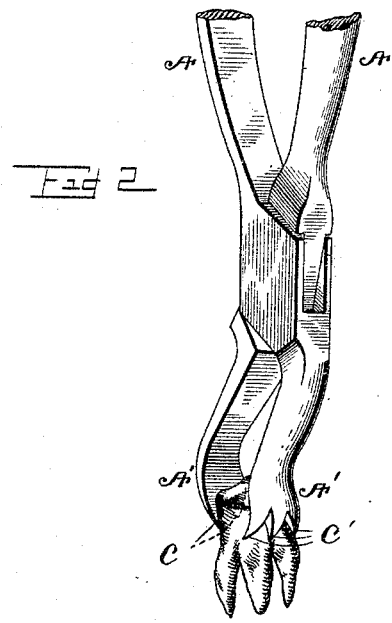

In the accompanying drawings—Figures 1 and 2 are perspective views of my improved dental forceps, the latter showing the application of the instrument or forceps to a previously extracted upper molar tooth.

The handles A, A, may be of the usual, or any approved construction for convenience in grasping by the hand, and are provided with jaws A′, A′, bent or curved at an angle to the handles to specially provide for the application of the same to an upper molar tooth. These jaws are provided, one, with a two-claw point c, each prong or tooth of the claw being preferably tapered or pointed, with an approximately V-shaped throat between them. The other jaw is provided with a tri-cuspidate, or three-claw point c′, c′, the prongs or teeth, as in the case of the two-claw-pointed jaw, being preferably tapered or pointed with approximately V-shaped throats between them. As before intimated, these jaws are specially adapted for removing upper molar teeth as these teeth have three roots, viz., two on one side and one on the other side.

The tri-cuspidate or three-claw-pointed jaw will grasp the tooth on the side having the two roots, (see Fig. 2.) while the two-claw-pointed jaw will grasp the side of the tooth having the single root. The grip thus obtained upon the tooth will be firm and unyielding, and the instrument cannot slip or crush the tooth, because the middle claw or beak of the tri-cuspidate or three-claw-pointed jaw, will enter or take into the bifurcation between the two roots, at the base or neck of the tooth, while the side claws thereof embrace the sides of the roots closely, and the two-claw-jaw will embrace the opposite root, thus securing a hold upon the tooth that will admit of great pressure and force being applied without liability of crushing the tooth, even though the tooth be but a mere shell. It will be understood that this class of forceps is necessarily made rights and lefts.

Having thus described my invention, what I claim is:

A dental forceps having its jaws provided, one, with a two-claw-point, and the other jaw, with a tri-cuspidate or three-claw-point, substantially as set forth.

In testimony whereof I affix my signature in presence of two witnesses.

CHAS. E. BLAKE, SR.

Witnesses:
 J. WM. MISTER,
 F. H. MOTHERSHEAD.